United States Patent Office 3,411,216
Patented Nov. 19, 1968

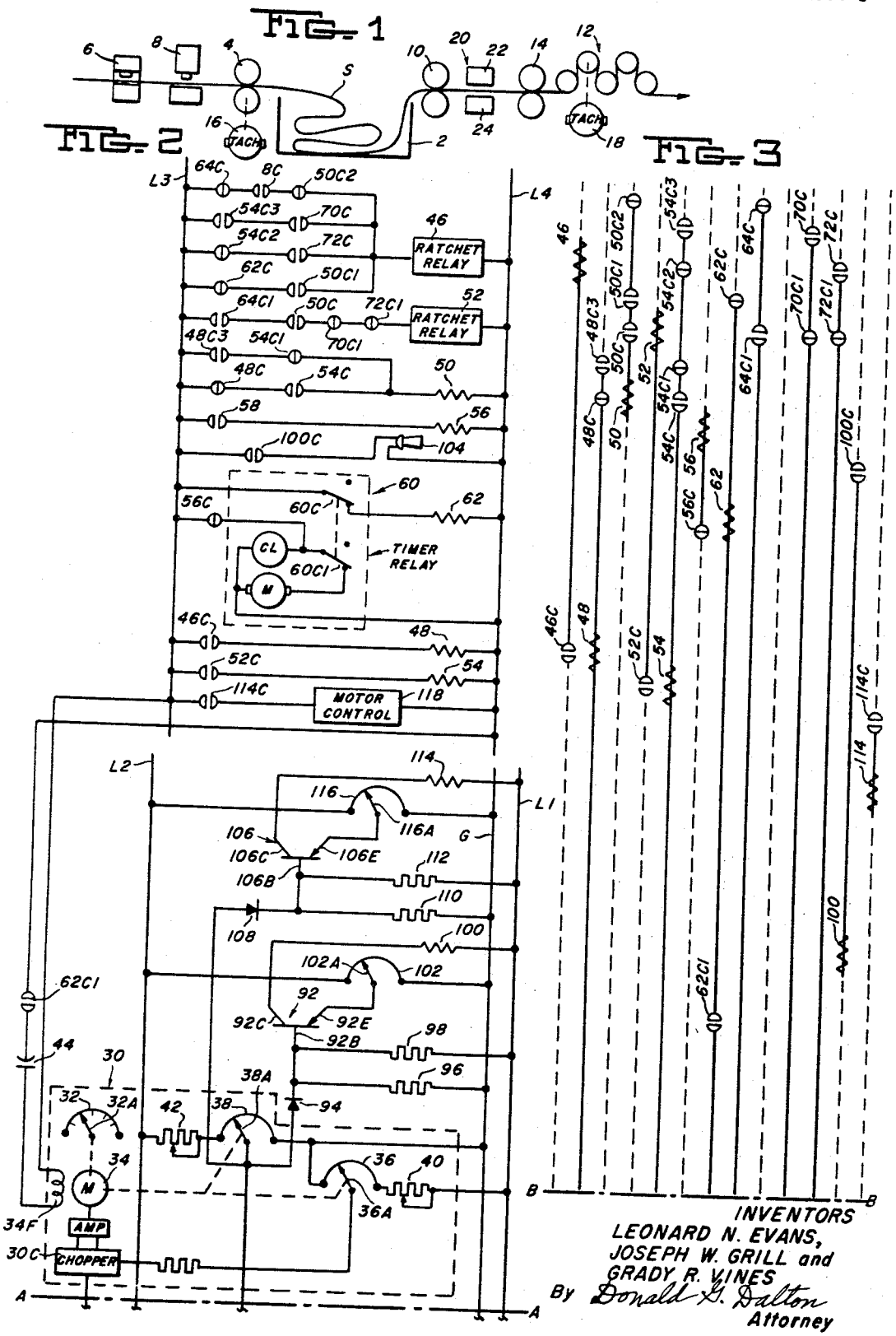

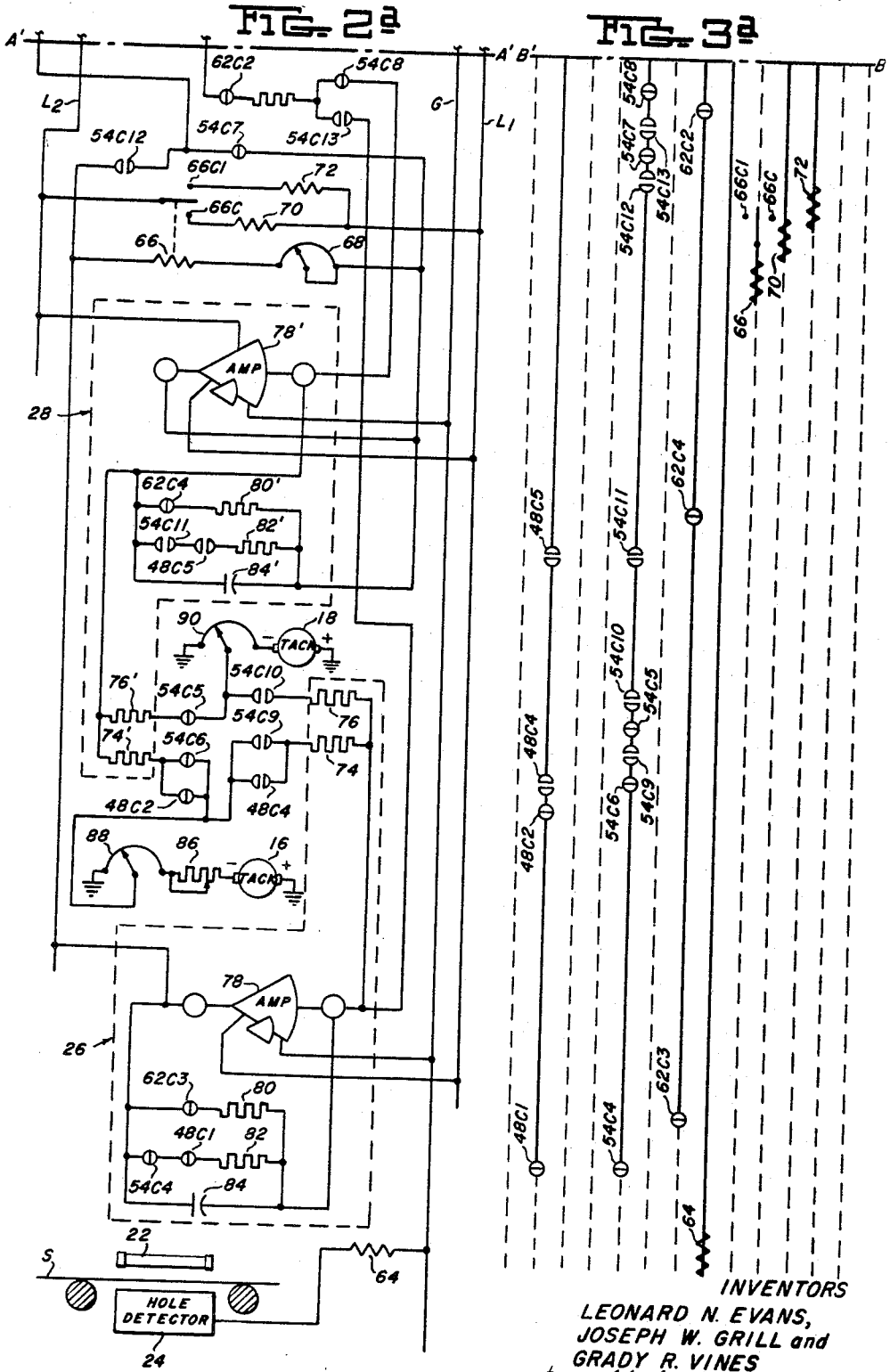

3,411,216
STRIP LENGTH GAUGE AND CONTROL
Leonard N. Evans, Pinson, Joseph W. Grill, Birmingham, and Grady R. Vines, Lipscomb, Ala., assignors to United States Steel Corporation, a corporation of Delaware
Filed June 11, 1965, Ser. No. 463,238
9 Claims. (Cl. 33—129)

ABSTRACT OF THE DISCLOSURE

Tachometer generators sensing the strip speed at the entrance and exit of a looping pit may be interconnected to two integrators. When a hole is punched in the strip at the entrance, the entrance tachometer is connected to add footage to the first integrator. When a sensor detects the hole at the exit, the exit tachometer is also connected to subtract footage from the first integrator and the pit footage is thereafter continuously shown on an indicator. When the next coil is started and before the first integrator is disconnected, the second integrator is connected to the entrance tachometer to collect an entering footage record, and when a hole made at that time is sensed at the exit, the second integrator indicates the pit footage at that time. Then the exit tachometer is switched from the first to the second integrator which thereafter counts the pit footage.

---

This invention relates to apparatus for measuring the length of strip and controlling line operation, particularly in a strip processing line having a looping pit. Apparatus for this general purpose is shown in Witt Patent No. 2,869,241, dated Jan. 20, 1959, and Rendel Patent No. 2,306,750, dated Dec. 29, 1942. However, the gauges and control disclosed in these patents have various disadvantages. The Rendel patent does not have any way of recalibrating the gauge during operation of the line and the Witt patent does not have any indication of the length of strip in the pit during recalibration of the gauge.

Since considerable slippage occurs and since the entry pinch rolls are moved apart during the welding cycle to permit a portion of the strip to pass through without being measured, it is desirable to recalibrate at relatively short intervals. With the Witt apparatus recalibrations would not be made frequently because the amount of time when there would be no indication of length would be too great. Obviously it is not desirable to stop the line during processing of the strip so that the Rendel apparatus would be far from satisfactory and could not be used to accurately indicate strip length. The Witt apparatus cannot be set up to stop the line when there is a minimum amount of strip in the pit since when recalibrating the indication is zero. There may be between 150 and 3,000 feet of strip in the pit and in this distance there may be more than one hole in the strip. Thus unless provision is made to ignore such holes within a relatively long distance of the calibrating hole, the recalibration will be in error. Since Witt has no provision to ignore such a hole, there is danger of the reading on his scale being far off. In some instances it is possible that the indicator will miss the hole and in such case Witt does not disclose any means for starting the recalibration cycle. The diameter of the rolls over which the strip passes and to which tachometers or generators are connected may vary since it is necessary to replace or redress the rolls from time to time. Witt does not have any means to compensate for such changes in roll diameters. The apparatus of Rendel also has these disadvantages.

It is therefore an object of our invention to provide a strip length gauge which can be recalibrated at frequent intervals with the length of strip being indicated substantially continuously.

Another object is to provide such a gauge which may be calibrated to compensate for variation in diameter of the feed and delivery rolls.

Still another object is to provide such a gauge which includes means for protecting against improper reading due to additional holes or other markings on the strip.

A still further object is to provide such a gauge which can be associated with a control to give a warning signal when the amount of strip in a pit is depleted to a certain minimum length and to stop the line when the strip is depleted to a still lower minimum length.

These and other objects will be more apparent after referring to the following specification and attached drawings, in which:

FIGURE 1 is a schematic view of a strip processing line with which our gauge and control may be associated;

FIGURES 2 and 2a, when connected at lines A—A and A'—A', form a schematic wiring diagram of the gauge and control of our invention, and FIGURES 3 and 3a, when connected at lines B—B and B'—B', show relays employed in the circuits of FIGURES 2 and 2a, the vertical spacing of relay contacts and coils being the same as in FIGURES 2 and 2a.

Referring more particularly to the drawings, reference 2 indicates a looper pit for storing strip S being processed. A pair of driven pinch rolls 4 feed strip S to pit 2. A welder 6 and hole punch 8 are mounted on the entry side of rolls 4. A pair of pinch rolls 10 are mounted on the exit side of pit 2. A driven delivery bridle 12 is mounted on the exit side of pit 2. A pair of pinch rolls 14 are mounted on the entry side of bridle 12. The parts so far described are conventional in a strip processing line.

According to our invention, we provide a tachometer 16 driven by one of the pinch rolls 4 and a similar tachometer 18 driven by one of the rolls in bridle 12. The tachometers 16 and 18 are conventional and their outputs accurately represent the speed of the strip passing between the pinch rolls 4 and through the bridle 12. Each tachometer may be an Esterline-Angus Model D 25-volt DC per 1,000 revolutions per minute.

Located between the pinch rolls 10 and 14 is a hole detector 20 which consists of a light source 22 and a light sensitive device 24. The hole detector 20 may be of any standard type which will generate current when a hole appears in the strip.

The outputs of tachometers 16 and 18 are connected to integrators 26 and 28. The outputs of integrators 26 and are connected to a voltage indicator 30. The voltage indicator 30 may be of any standard type, but is preferably a Bristol indicator Model 565 Dynamaster, Model No. 1PH565-51, Ser. No. 563,962, Scale 57,314. The indicator 30 includes a scale 32 calibrated to read number of feet in the pit. Arm 32A is connected to a reversible motor 34. Motor 34 is also mechanically connected to arm 36A of slide wire 36 and to arm 38A of slide wire 38. One side of slide wire 36 is connected through an adjustable resistor 40 to negative bus L1 which is preferably at a potential of minus 12 volts. The other side of slide wire 36 is connected to ground G. One side of slide wire 38 is connected through an adjustable resistor 42 to positive bus L2 which is preferably at a potential of 12 volts. Preferably, the potential of buses L1 and L2 are equal and opposite in polarity. The indicator 30 also includes motor field 34F which is connected through phase shifting capacitor 44 to an AC power source L3, L4.

Operation of the punch 8 closes a normally open switch 8C which is open at all times except when the punch is punching a hole in the strip S. A conventional ratchet relay 46 is connected in series with switch 8C across lines L3, L4. The relay 46 has a normally open contact 46C which is connected in series with relay coil 48 across lines L3, L4. Relay 48 has normally closed contacts 48C, 48C1, 48C2 and normally open contacts 48C3, 48C4 and 48C5. Contacts 48C and 48C3 are connected in parallel wtih each other and in series with relay coil 50. Relay 50 has normally open contacts 50C and 50C1, and a normally closed contact 50C2 which is connected in series with contact 8C. Contact 50C1 is connected in series with ratchet relay 46. Contact 50C is connected in series with ratchet relay 52 which has a normally open contact 52C. Relays 46 and 52 are conventional ratchet relays such as Potter-Brumfield No. AP11A, which provide on-off action on alternate operations. Contact 52C is connected in series with relay coil 54 which has normally open contact 54C connected in series with contact 48C and relay coil 50, a normally closed contact 54C1 connected in series with contact 48C3 and relay coil 50, normally closed contact 54C2, normally open contact 54C3, normally closed contacts 54C4, 54C5, 54C6, 54C7 and 54C8 and normally open contacts 54C9, 54C10, 54C11, 54C12 and 54C13.

A relay coil 56 is connected in series with a contact or switch 58 which is open when the strip processing line stops and closed while the line is running. Relay 56 has a normally closed contact 56C which is connected in series with a timer relay 60 having normally closed contact 60C and 60C1 which are timed open. The relay 60 may be of any standard type such as Eagle Model No. HD 32A622. Contact 60C is connected in series with a relay coil 62 having a normally closed contact 62C connected in series with contact 50C1, normally open contact 62C1 connected in series with field 34F and capacitor 44, and normally closed contacts 62C2, 62C3 and 62C4.

The output of hole detector 20 is connected to a relay coil 64 having a normally closed contact 64C connected in series with contacts 8C and 50C2 and relay 46, and normally open contact 64C1 connected in series with contact 50C. A relay coil 66 is mounted across the output of integrators 26 and 28 in series with an adjustable rheostat 68. Relay 66 is a standard polarity sensitive type, such as Thomas A. Edison Industries No. 219–A3SS, having contacts 66C and 66C1. Contact 66C is connected in series with relay coil 70 and contact 66C1 in series with relay coil 72. Relay 70 has a normally open contact 70C connected in series with contact 54C3 and normally closed contact 70C1 connected in series with contact 50C. Relay 72 has a normally open contact 72C connected in series with contact 54C2 and normally closed contact 72C1 connected in series with contact 70C1.

Integrator 26 includes resistor 74 connected in series with contact 54C9, resistor 76 connected in series with contact 54C10, an operational amplifier 78, resistor 80 connected in series with contact 62C3 to amplifier 78, resistor 82 connected in series with contacts 48C1 and 54C4 to amplifier 78, and a capacitor 84 connected across amplifier 78.

Integrator 28 is essentially the same as integrator 26 and includes resistor 74' connected in series with contact 54C6, resistor 76' connected in series with contact 54C5, amplifier 78', resistor 80' connected in series with contact 62C4 to amplifier 78', resistor 82' connected in series with contacts 48C5 and 54C11 to amplifier 78', and a capacitor 84' connected across amplifier 78'.

The output of tachometer 16 is connected through variable resistors 86 and 88 to contacts 48C4, 48C2, 54C6 and 54C9 and hence to the integrators 26 and/or 28. The output of tachometer 18 is connected through variable resistor 90 to contacts 54C5 and 54C10 and hence to the integrators.

Arm 38A is connected to base 92B of a transistor 92 through a rectifier 94. Resistor 96 is connected between base 92B and rectifier 94 to ground and resistor 98 is connected between base 92B and bus L1. Collector 92C is connected through relay coil 100 to line L1. Emitter 92E is connected to arm 102A of potentiometer 102 which is connected between bus L2 and ground G. Relay 100 has a normally open contact 100C which is connected in series with a horn 104 between AC buses L3 and L4. Arm 38A is also connected to base 106B of a transistor 106 in series with a rectifier 108. The transistors 92 and 106 may be of a standard type such as No. 2N404. A resistor 110 is connected between base 106B and rectifier 108 to ground, and a resistor 112 is connected between bus L1 and base 106B. Collector 106C is connected in series with relay coil 114 to bus L1. Emitter 106E is connected to arm 116A of potentiometer 116 which is connected between bus L2 and ground. Relay 114 has a normally open contact 114C which is connected to buses L3, L4 in series with motor control 118 which stops movement of strip through the processing line.

It will be apparent that resistors, safety devices and the like may be included in the circuits as is commonly done.

When the strip length gauge and control are first started in operation, the strip S is first pulled tight between the welder 6 and the pinch rolls 14 and 4 and power is supplied to the circuit. Ratchet relays 46 and 52 are set so that their contacts 46C and 52C are open. When timer relay 60 is energized, relay 62 will be energized and will remain energized for a period of five minutes or until the line is stopped for a period of five minutes. Because relay contacts 48C4 and 54C9 are open, no signal will be impressed on integrator 26 from tachometer 16. However, contacts 48C2 and 54C6 are closed so that the output of tachometer 16 will be impressed on integrator 28. Since contact 54C5 is closed, the output of tachometer 18 will also be impressed on integrator 28. Since contact 54C10 is open, the output of tachometer 18 will not be impressed on integrator 26.

Prior to starting the processing line, resistors 88 and 90 are set so that the output of tachometers 16 and 18 are the same for the same speed of the strip when resistor 86 is set to correspond to the diameter of pinch roll 4. If pinch roll 4 is changed or its size changes for any reason, the setting of resistor 86 is changed correspondingly.

The line is then started in operation and the output of tachometers 16 and 18 will be impressed on the integrator 28. The output of integrator 28 is connected to chopper 30C of Bristol indicator 30 through closed contact 54C7. The pointer 32A will point to zero on scale 32 as long as the strip is tight between pinch rolls 4 and 14. The strip will then be fed into the pit faster than it is withdrawn in the usual manner. As this occurs, the output voltage of integrator 28 will rise so that the chopper 30C will see an imbalance between the voltage of integrator 28 and the voltage across arm 36A of slide wire 36 which causes motor 34 to rotate in such a direction as to move arm 36A until the voltages are in balance. At the same time pointer 32A is moved so as to indicate the length of strip in the pit minus the straight line distance between punch 8 and hole detector 20. Slide wire arm 38A will also move a corresponding amount and a signal from arm 38A will be impressed on transistors 92 and 106. Assuming that potentiometer 102 has been set so that the transistor 92 will conduct when less than 600 feet is in the pit, relay contact 100C will close and the horn 104 will blow and continue to blow until 600 feet of strip has accumulated in the pit. Assuming that the potentiometer 116 is set so that transistor 106 will conduct when less than 300 feet is in the pit, the transistor 106 will be conducting at this time and contact 114C will be closed and the motor control 118 will stop the line momentarily. The operator will then start the line in operation again and maintain movement until more than 300 feet is in the pit. Thereafter, as long as more than 300 feet remains in the pit, no operation of relay 114 will occur. It will be noted that the reading on indicator 30 is incorrect at this time and will continue to be incorrect until after the initial calibration. However, since more strip is in the pit than indicated, no damage can occur.

When a new coil of strip is welded to the strip already in the pit 2, punch 8 operates in the usual manner to punch a hole in the strip adjacent the weld and the punch operates to close contact 8C. When this occurs ratchet relay 46 is energized to close its contact 46C which in turn energizes relay coil 48. Energization of relay coil 48 closes contact 48C4 so that the output of tachometer 16 is impressed on integrator 26. At the same time, contact 48C2 opens, but the output of generator 16 continues to be impressed on integrator 28 through closed contact 54C6. Contact 48C1 also opens, thus permitting integrator 26 to operate. Contact 48C5 closes, but this does not affect the operation of integrator 28. Contact 48C3 also closes, thus completing a circuit through relay 50. Energization of relay 50 opens contact 50C2, thus preventing energization of relay 46 until the calibration cycle is complete. Contact 50C1 also closes but since contact 62C is open, this has no effect.

In order to prevent false calibration by detecting a hole other than the one already punched, potentiometer 68 is adjusted so that relay 66 will be energized when the outputs of integrators 26 and 28 differ by an amount equivalent to a length of 200 feet. This distance can, of course, be varied. If the output of integrator 28 is the greater, contact 66C will close to energize relay 70. If the reverse is true, contact 66C1 will close to energize relay 72. Energization of relay 70 will close contact 70C and energization of relay 72 will close contact 72C. When the punched hole comes to the detector 20, relay 64 will be energized, thus opening contact 64C and closing contact 64C1. Closing of contact 64C1 energizes relay 52, thus closing its contact 52C to energize relay 54. Energization of relay 54 closes its contacts 54C9 and 54C10 and opens its contacts 54C6 and 54C5. Thus the outputs of tachometers 16 and 18 are applied to integrator 26, but not to integrator 28. Contact 54C4 opens and contact 54C11 closes. Closing of contact 54C11 resets integrator 28. At this time the true length of strip in the pit 2 is shown on indicator 30. Contact 54C1 opens, thus deenergizing relay 50 and returning its contacts to their normal position. The operation then continues with the true reading of strip being indicated by indicator 30 and with a sufficient length of strip in the pit 2. Nothing happens until the punch 8 again operates. However, if the amount of strip in the pit 2 decreases below that set by potentiometer 102, the horn 104 will blow. When this occurs, the operator will either decrease the feed from the pit or increase the feed into the pit. However, if he fails to do this, and the amount of strip in the pit further decreases to that set by potentiometer 116, the motor control 118 will operate to stop the line and the operator must then restart it.

When another coil of strip is welded to the second coil, the contact 8C will close thus energizing relay 46 and opening its contact 46C. This deenergizes relay 48 thus opening its contacts 48C4 and 48C5 and closing its contacts 48C2 and 48C1. Thus the output of tachometer 16 will be applied to integrator 26 through contact 54C9 and to integrator 28 through contact 48C2, and the output of tachometer 18 is applied only to integrator 26 since contact 54C5 is open. At this time the output from integrator 26 is applied through contact 54C12 to the indicator 30 and the output of integrator 28 is prevented from reaching indicator 30 since contact 54C7 is open. If nothing out of the way happens, this operation will continue until the hole is detected by detector 20. When this occurs, relay 64 is momentarily energized, thus closing contact 64C1 and energizing relay 52. Energization of relay 52 opens contact 52C, thus deenergizing coil 54 and completing the recalibration cycle. When this occurs, the outputs of tachometers 16 and 18 will be applied to the integrator 28, but not to integrator 26 since contacts 48C4, 54C9 and 54C10 are all open. The output of integrator 28 is applied to indicator 30 through contact 54C7.

During the recalibration cycle it is possible that a hole may have been in the strip between the punched sensing hole and the hole detector 20. When this occurs, and the wrong hole is detected with the output of integrators 26 and 28 disagreeing in an amount of 200 feet or more, the detection of this hole will not energize relay 52. If the output of integrator 28 is less than the output of integrator 26 by an amount of 200 feet or less, relay 66 will be energized, thus closing its contact 66C1 to energize relay 72. This opens contact 72C1, thus preventing energization of coil 52. If the calibrating hole is missed by the indicator 20, the output of integrator 28 will become greater than the output of integrator 26, thus energizing relay 66 to close contact 66C which will energize relay 70. This will close contact 70C, thus completing the circuit to ratchet relay 46 through closed contact 54C3. This energization of relay 46 will close contact 46C so that integrator 26 will continue to measure the length of strip in the pit and the recalibration cycle will cease with integrator 28 being reset. The operations continue in this manner with the gauge being recalibrated each time a new coil is attached following recalibration.

In case the line goes down for a period of over five minutes, timer 60 will time out and contact 60C will open, thus deenergizing relay 62. This closes contact 62C and completes a circuit to relay 46 if there is a recalibration cycle in process. This resets the calibrating integrator 26 or 28 and sets the circuits so that the next time a hole is punched a recalibrating cycle will be initiated. Contact 62C1 will open to prevent motor 34 from running. Contacts 62C2, 62C3 and 62C4 will also close. Closing of contacts 62C3 and 62C4 changes the operation of integrators 26 and 28 so that they will function as amplifiers. The integrator which has been indicating is held from drifting regardless of whether or not the gauge was in a recalibrating cycle. Assuming that integrator 26 was in a calibrating cycle, this is accomplished by the arrangement of closed contact 62C3 and resistor 80 connected in parallel with capacitor 84 across amplifier 78 and by the voltage from arm 38A connected through closed contacts 62C2 and 54C13 to amplifier 78.

While one embodiment of our invention has been shown and described, it will be apparent that other adaptations and modifications may be made.

We claim:
1. Apparatus for measuring the length of moving strip between spaced points comprising first measuring means for obtaining an electrical impulse proportional to the speed of strip passing the first of said points, second measuring means for obtaining an electrical impulse proportional to the speed of strip passing the second of said points, a first integrator, a second integrator, a first connection between said first measuring means and said first integrator, a second connection between said first measuring means and said second integrator, a third connection between said second measuring means and said first integrator, a fourth connection between said second measuring means and said second integrator, means in each of said connections for selectively opening and closing the connection, said first integrator subtracting the impulse from said second measuring means from the impulse from said first measuring means to obtain a signal proportional to the length of strip between said points when said first and third connections are closed, said second integrator subtracting the impulse from said second measuring means from the impulse from said first measuring means to obtain a signal proportional to the length of strip between said points when said second and fourth connections are closed, and means for operating the said means in said connections to open the first and third connections and close the second and fourth connections and then to close the first and third connections and open the second and fourth connections.

2. Apparatus according to claim 1 including a voltmeter connected to the output of said integrators and calibrated to indicate length of strip.

3. Apparatus according to claim 2 including means connected to said voltmeter for giving a signal when the length of measured strip falls below a preset amount.

4. Apparatus according to claim 3 including means connected to said voltmeter for stopping movement of said strip when the length of measured strip falls below a preset amount less than the first preset amount.

5. Apparatus for measuring the length of moving strip between spaced points comprising first measuring means for obtaining an electrical impulse proportional to the speed of strip passing the first of said points, second measuring means for obtaining an electrical impulse proportional to the speed of strip passing the second of said points, means adjacent said first point for applying a mark to said strip, means adjacent said second point for detecting the mark on said strip, a first integrator, a second integrator, a first connection between said first measuring means and said first integrator, a second connection between said first measuring means and said second integrator, a third connection between said second measuring means and said first integrator, a fourth connection between said second measuring means and said second integrator, means in each of said connections for selectively opening and closing the connection, said first integrator subtracting the impulse from said second measuring means from the impulse from said first measuring means to obtain a signal proportional to the length of strip between said points when said first and third connections are closed, said second integrator subtracting the impulse from said second measuring means from the impulse from said first measuring means to obtain a signal proportional to the length of strip between said points when said second and fourth connections are closed, means operable by application of said mark to close one of the connections to one of the integrators when the connections to the other integrator are closed, and means operable by said detecting means when said mark reaches the detecting means to close the other connection to said one of the integrators and open the connections to the said other integrator.

6. Apparatus for measuring the length of moving strip between spaced points comprising first measuring means for obtaining an electrical impulse proportional to the speed of strip passing the first of said points, second measuring means for obtaining an electrical impulse proportional to the speed of strip passing the second of said points, means adjacent said first point for applying a mark to said strip, means adjacent said second point for detecting the mark on said strip, a first integrator, a second integrator, a first connection between said first measuring means and said first integrator, a second connection between said first measuring means and said second integrator, a third connection between said second measuring means and said first integrator, a fourth connection between said second measuring means and said second integrator, means in each of said connections for selectively opening and closing the connection, said first integrator subtracting the impulse from said second measuring means from the impulse from said first measuring means to obtain a signal proportional to the length of strip between said points when said first and third connections are closed, said second integrator subtracting the impulse from said second measuring means from the impulse from said first measuring means to obtain a signal proportional to the length of strip between said points when said second and fourth connections are closed, means operable by application of said mark to close said first connection when said second and fourth connections are closed, and means operable by said detecting means when said mark reaches the detecting means to close said third connection and open said second and fourth connections.

7. In a strip processing line including a strip storage pit, means for connecting lengths of strip end to end on the entry side of said pit, and means adjacent said last named means for punching a hole in said strip adjacent the strip connection; a gauge for measuring the length of strip between a first point adjacent said punching means and a second point on the exit side of said pit comprising first measuring means for obtaining an electrical impulse proportional to the speed of strip passing the first of said points, second measuring means for obtaining an electrical impulse proportional to the speed of strip passing the second of said points, means adjacent said second point for detecting the hole, a first integrator, a second integrator, a first connection between said first measuring means and said first integrator, a second connection between said first measuring means and said second integrator, a third connection between said second measuring means and said first integrator, a fourth connection between said second measuring means and said second integrator, means in each of said connections for selectively opening and closing the connection, said first integrator subtracting the impulse from said second measuring means from the impulse from said first measuring means to obtain a signal proportional to the length of strip between said points when said first and third connections are closed, said second integrator subtracting the impulse from said second measuring means from the impulse from said first measuring means to obtain a signal proportional to the length of strip between said points when said second and fourth connections are closed, means operable by operation of said punching means to close one of the connections to one of the integrators when the connections to the other integrator are closed, and means operable by said detecting means when said hole reaches the detecting means to close the other connection to said one of the integrators and open the connections to the said other integrator.

8. The combination of claim 7 including means for preventing operation of said last named means until said hole is detected.

9. The combination of claim 7 including means operable when said hole has passed said detector without being detected for preventing operation of said last named means and to reopen said one of the connections and reset said one of the integrators.

References Cited

UNITED STATES PATENTS

| | | | |
|---|---|---|---|
| 3,197,137 | 7/1965 | Watson | 235—103.5 |
| 3,182,402 | 5/1965 | Klager | 33—132 |

LEONARD FORMAN, *Primary Examiner.*

FELIX J. D'AMBROSIO, *Assistant Examiner.*